(12) United States Patent
Balistreri et al.

(10) Patent No.: US 10,479,150 B2
(45) Date of Patent: Nov. 19, 2019

(54) WHEEL VALVE ASSEMBLY AND THE TIRE INFLATION SYSTEM MADE THEREWITH

(71) Applicant: Dana Heavy Vehicle Systems Group, LLC, Maumee, OH (US)

(72) Inventors: Lucas A. Balistreri, Maumee, OH (US); Christopher D. Blessing, Toledo, OH (US); Philip M. Molloy, Portage, MI (US); Jason M. Sidders, Perrysburg, OH (US)

(73) Assignee: Dana Heavy Vehicle Systems Group, LLC, Maumee, OH (US)

(*) Notice: Subject to any disclaimer, the term of this patent is extended or adjusted under 35 U.S.C. 154(b) by 79 days.

(21) Appl. No.: 15/634,570

(22) Filed: Jun. 27, 2017

(65) Prior Publication Data

US 2017/0368896 A1 Dec. 28, 2017

Related U.S. Application Data

(60) Provisional application No. 62/354,988, filed on Jun. 27, 2016.

(51) Int. Cl.
| | |
|---|---|
| *F16K 15/20* | (2006.01) |
| *B60C 29/00* | (2006.01) |
| *F16K 17/04* | (2006.01) |
| *F16K 15/14* | (2006.01) |
| *B60C 23/00* | (2006.01) |

(52) U.S. Cl.
CPC .......... *B60C 29/002* (2013.01); *B60C 23/001* (2013.01); *F16K 15/145* (2013.01); *F16K 17/0406* (2013.01); *F16K 17/048* (2013.01); *Y10T 137/3631* (2015.04); *Y10T 137/7869* (2015.04)

(58) Field of Classification Search
CPC ................. B60C 29/002; Y10T 137/36; Y10T 137/3631; Y10T 137/7836; Y10T 137/7842; Y10T 137/7869
USPC .................................................. 152/415, 417
See application file for complete search history.

(56) References Cited

U.S. PATENT DOCUMENTS

| 3,392,751 A * | 7/1968 | Pommersheim ...... F16K 31/165 137/494 |
| 4,310,016 A * | 1/1982 | Aubel .................... F02M 3/062 137/493.8 |

(Continued)

FOREIGN PATENT DOCUMENTS

WO 2016094633 A1 6/2016

*Primary Examiner* — Robert K Arundale
(74) *Attorney, Agent, or Firm* — Marshall & Melhorn, LLC (57) ABSTRACT

A wheel valve assembly having a body portion coupled with a cover portion. A diaphragm disposed between the body portion and the cover portion. A first biasing member disposed between the cover portion and the diaphragm in a cover cavity defined thereby. A control cavity defined by the body portion and the diaphragm, and at least one control port defined by the body portion and in fluid communication with the control cavity. A tire port defined by the body portion and in selective fluid communication with the control cavity. A first and second conduit disposed in the body portion in fluid communication with a third and fourth conduit disposed in the cover portion. An equalization valve assembly disposed in one of the conduits to control fluid communication between the cover cavity and the control cavity.

4 Claims, 13 Drawing Sheets

(56) References Cited

U.S. PATENT DOCUMENTS

| | | | |
|---|---|---|---|
| 4,508,131 A * | 4/1985 | DeFrees | B60K 15/0406 |
| | | | 137/43 |
| 4,805,681 A | 2/1989 | Vollmer et al. | |
| 4,883,105 A | 11/1989 | Schultz | |
| 4,893,664 A | 1/1990 | Oltean | |
| 5,441,202 A * | 8/1995 | Wintering | F24F 5/0035 |
| | | | 239/267 |
| 6,408,913 B1 | 6/2002 | Caretta et al. | |
| 7,089,953 B2 | 8/2006 | Beau | |
| 7,686,051 B2 | 3/2010 | Medley et al. | |
| 9,352,621 B2 | 5/2016 | Morgan | |
| 2005/0133134 A1 | 6/2005 | Ingram et al. | |
| 2005/0205182 A1 | 9/2005 | Maquaire et al. | |
| 2015/0096655 A1 | 4/2015 | Koulinitch et al. | |
| 2016/0144675 A1 | 5/2016 | Knepple et al. | |
| 2016/0167458 A1 | 6/2016 | Laanemets et al. | |
| 2016/0169762 A1 | 6/2016 | Summers et al. | |

* cited by examiner

WHEEL VALVE ASSEMBLY AND THE TIRE INFLATION SYSTEM MADE THEREWITH

RELATED APPLICATIONS

The present application claims the benefit to U.S. Provisional Application No. 62/354,988 filed on Jun. 27, 2016, which is incorporated herein by reference in its entirety.

BACKGROUND

This disclosure relates to tire inflation systems and more particularly to a wheel valve assembly utilized in a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire life-span. In addition, tire inflation systems increase a vehicle's maneuverability over differing terrains and reduce maintenance requirements.

Tire inflation systems often employ a wheel valve assembly to communicate pressurized fluid to a wheel assembly, to retain fluid in a wheel assembly and adjust or maintain the pressure thereof. Conventional wheel valves may suffer from performance issues due to the range of temperatures they operate in, the forces they are exposed to, and/or the specialized functions they are designed to perform. Further, hot and cold temperatures may create pressure differences within the tire inflation system which can cause a failure of the system. In view of the above, there remains a need for a wheel valve assembly operable in an increased temperature and pressure range.

SUMMARY

The present disclosure provides for a wheel valve assembly having a body portion coupled with a cover portion. A diaphragm is disposed between the body portion and the cover portion. A first biasing member is disposed between the cover portion and the diaphragm in a cover cavity defined by the cover portion and the diaphragm. A control cavity is defined by the body portion and the diaphragm, and at least one control port is defined by the body portion and is in fluid communication with the control cavity. A tire port is also defined by the body portion and is in selective fluid communication with the control cavity. A radially extending first conduit is disposed in the body portion and is in fluid communication with the control cavity. An axially extending second conduit is disposed in the body portion, and is in fluid communication with the first conduit. An axially extending third conduit is disposed in the cover portion, and is in fluid communication with the second conduit. A radially extending fourth conduit is disposed in the cover portion, and is in fluid communication with the third conduit and the cover cavity. An equalization valve assembly is disposed between the first and the second conduit to control fluid communication between the cover cavity and the control cavity.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. In certain embodiments, the tire inflation system 10 is utilized with a vehicle (not depicted). The tire inflation system 10 may be a central tire inflation system (CTIS) for a commercial vehicle. Further, the tire inflation system 10 described herein may have applications in both light duty and heavy duty vehicles, and for passenger, commercial, and off-highway vehicles. It would be understood by one of ordinary skill in the art that the tire inflation system 10 has industrial, locomotive, military, agricultural, and aerospace applications.

Figure 1:
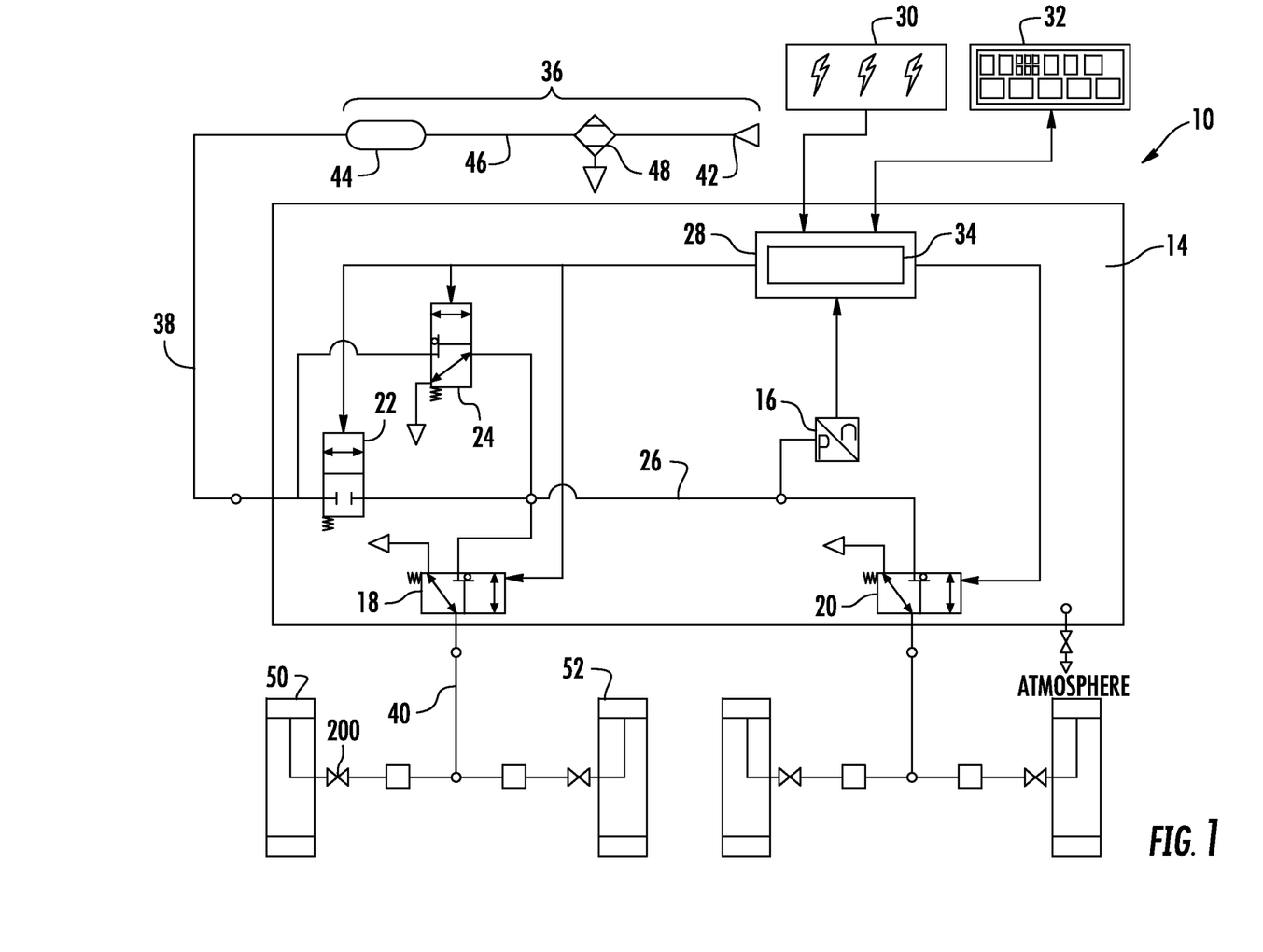
FIG. 1 depicts a schematic view of a tire inflation system according to an embodiment of the presently disclosed subject matter.

A schematic depiction of an embodiment of the tire inflation system 10 is illustrated in FIG. 1. The tire inflation system 10 is described herein with reference to a pressurized fluid such as, for example, air. The tire inflation system 10 may have inflate and/or deflate capability to allow a tire pressure to be increased and/or decreased.

The tire inflation system 10 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first control unit conduit 26 for controlling the flow of, and directing, air through the system 10.

It will be understood by those familiar in the relevant art that the control unit 14 may comprise a mechatronic control unit (MCU) or a pneumatic control unit (PCU), but is not limited thereto.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first control unit conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 10 will be described below with reference to the tire pressure of one tire 50. However, the tire inflation system 10 may at certain times be in fluid communication with a plurality of tires.

Figure 2:
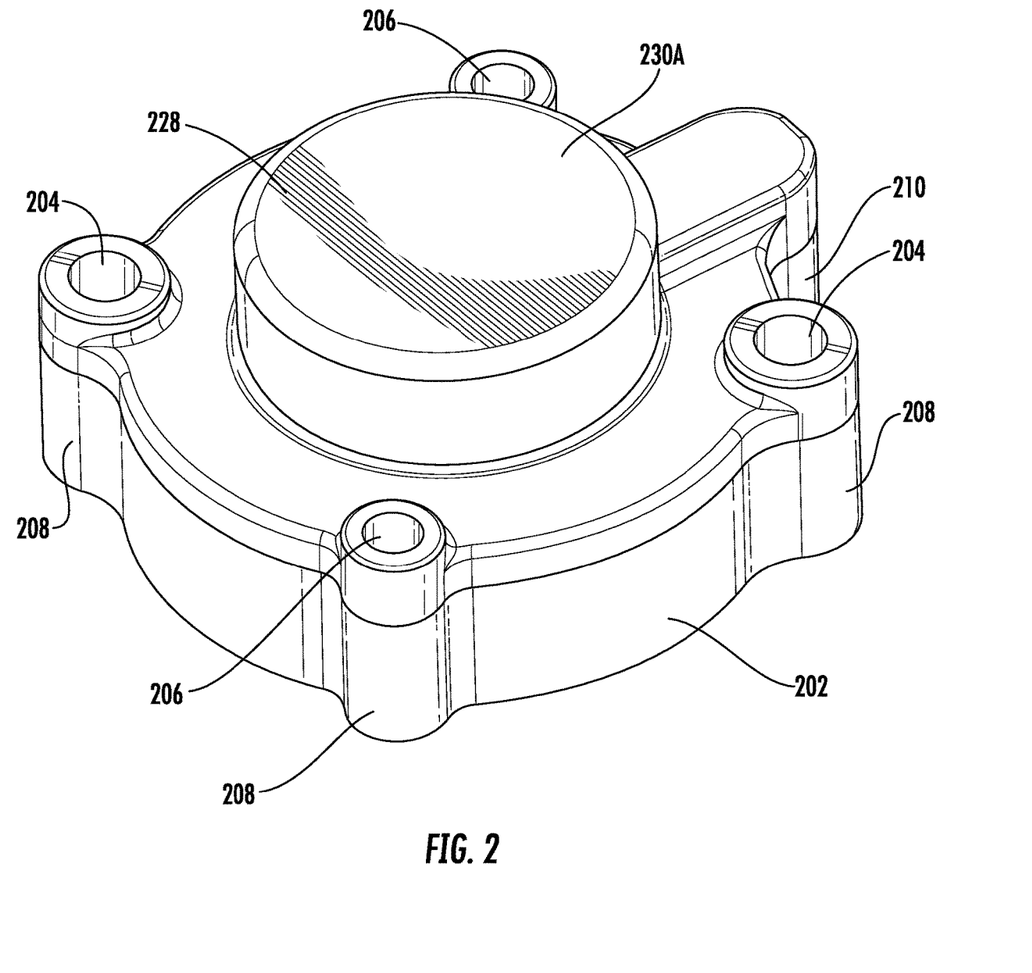
FIG. 2 is an isometric view of an embodiment of a wheel valve assembly of the tire inflation system of FIG. 1.

The fluid control circuit 40 comprises a wheel valve assembly 200. The wheel valve assembly 200 is associated with a tire 50. As illustrated in FIG. 2, in an embodiment, the wheel valve assembly 200 comprises a valve body 202. The valve body 202 may be substantially cylindrical in geometry having a first pair of fastener apertures 204 located at generally opposite positions on the circumference of the valve body 202. A second pair of fastener apertures 206 are also located at generally opposite positions on the circumference of the valve body 202. In an embodiment, the second pair of fastener apertures 206 are located between the first pair of fastener apertures 204 such that the first and second pairs of fastener apertures 204, 206 are equilaterally spaced about the circumference of the of the valve body 202. In an embodiment, the valve body 202 comprises four equilaterally disposed radially protruding semi-cylindrical portions 208 extending the longitudinal length thereof. The first and second pairs of fastener apertures 204, 206 may be at least partially disposed through the semi-cylindrical portions 208.

The valve body 202 further comprises an equalization valve housing 210. In an embodiment, the equalization valve housing 210 may comprise a radially protruding portion of the valve body 202.

A tire port 212, having aperture 216, is disposed in the bottom 214 of the valve body 202. The tire port 212 is in selective fluid communication with the tire 50 and the control unit 14. The tire port 212 comprises an axially extending protuberance 218 defined by the valve body 202. The protuberance 218 extends into a substantially annular control cavity 220 partially defined by the interior surface of the valve body 202 and the protuberance 218. A tire port channel 222 is disposed through the protuberance 218 and places the control cavity 220 in selective fluid communication with the tire port 212 aperture 216.

A pair of control ports 224 are also disposed in the bottom 214 of the valve body 202. The control ports 224 are in fluid communication with the control unit 14 and the control cavity 220. The control ports 224 are in selective fluid communication with the tire port 212 via the control cavity 220 and a diaphragm 226 (further described intra).

Figure 3:
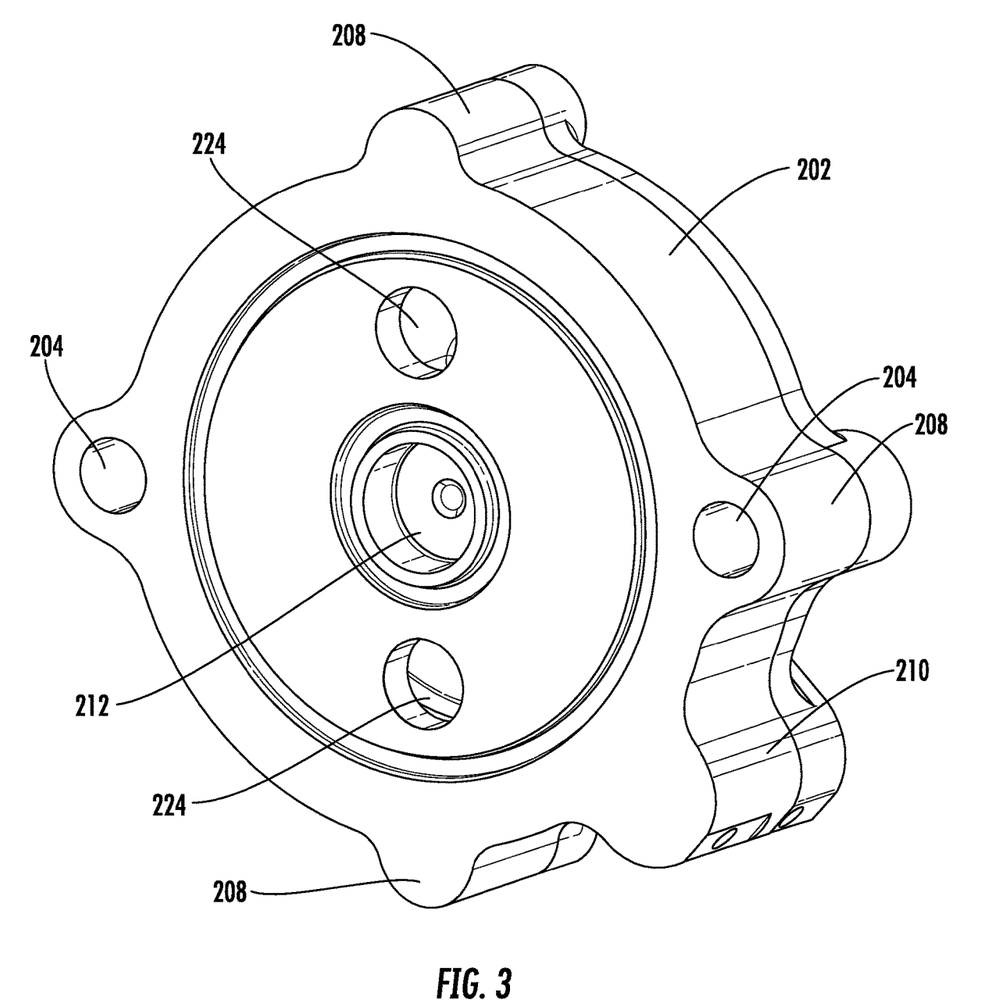
FIG. 3 is another isometric view of the wheel valve assembly of FIG. 2.
Figure 4:
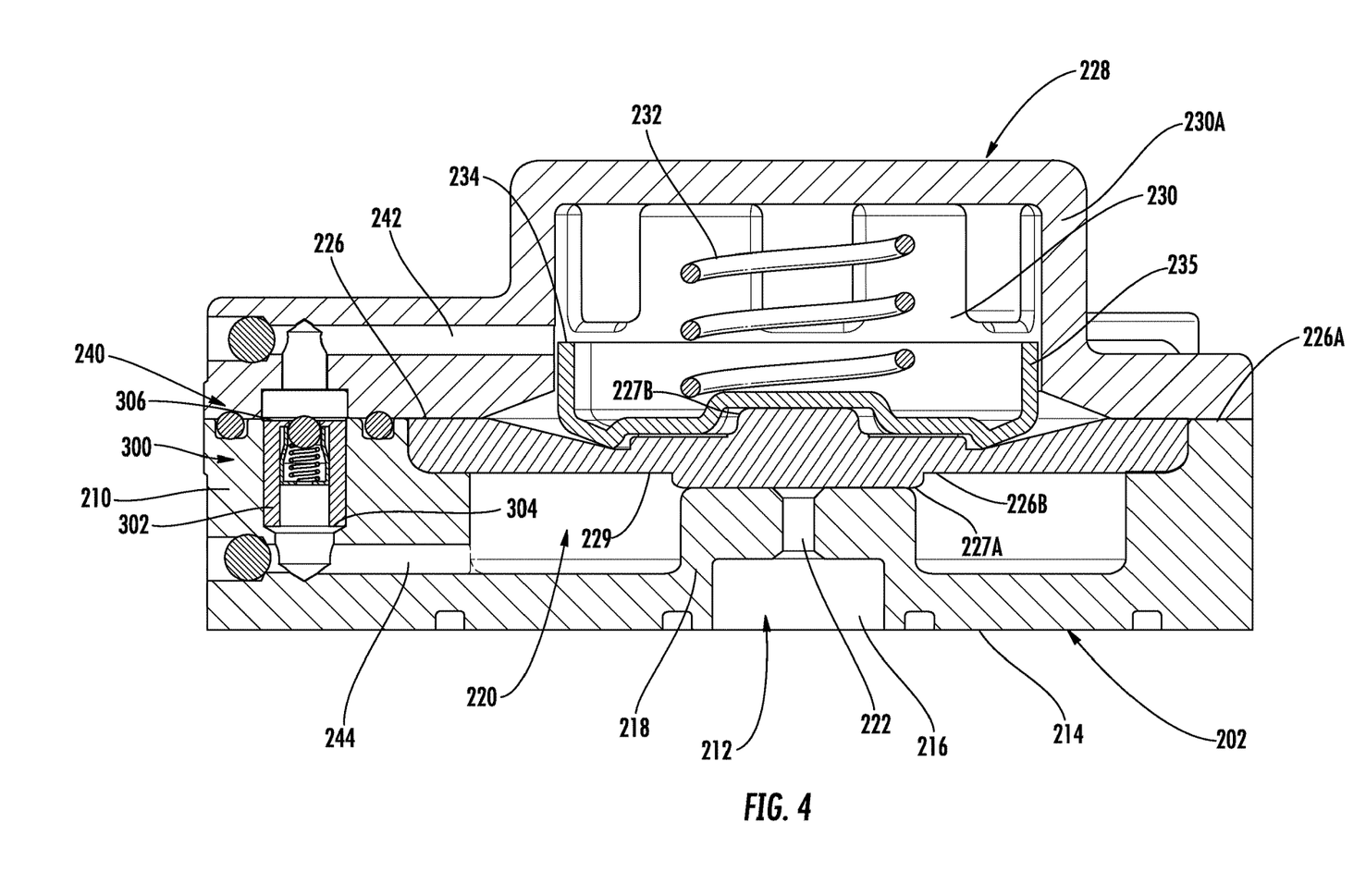
FIG. 4 is a cross-sectional view of the wheel valve assembly of FIG. 2.

As illustrated in FIGS. 2, 3, and 4, the wheel valve assembly 200 comprises a valve cover 228. The valve cover 228 includes complimentary semi-cylindrical portions having the first and second pair of fastener apertures 204, 206 extending therethrough, respectively. The valve cover 228 may be coupled with the valve body 202 via mechanical fasteners (not depicted) through the second pair of fastener apertures 206 (see FIG. 2). A pair of mechanical fasteners (not depicted) may also be disposed through the first pair of fastener apertures 204 for coupling the wheel valve assembly 200 with a wheel rim (not depicted). The valve cover 228 also comprises an axially extending portion 230A which at least partially defines a cover cavity 230. The cover cavity 230 and the control cavity 220 are separated by, and partially defined by, the diaphragm 226. The valve cover 228 and valve cover portion 230A at least partially house a biasing member 232 and a backing plate 234.

The diaphragm 226 comprises a substantially discoid member including a first portion 226A and a second portion 226B. The first portion 226A is coupled between the cover 228 and valve body 202 such that the second portion 226B of the diaphragm 226 may actuate in an axial direction. The second portion 226B includes a first axially extending protrusion 227A. The first protrusion 227A defines a surface which selectively sealingly engages the protuberance 218. The second portion 226B also includes a second axially extending protrusion 227B which projects opposite the first protrusion 227A. The second portion 226B further includes a discoid shoulder 229. The second protrusion 227B and the shoulder 229 of the diaphragm 226 are engaged with, and at least partially located within, complimentary depressions in the lower surface of the backing plate 234. The backing plate 234 includes a substantially cylindrical wall 235. The wall 235 may guide the backing plate 234 during actuation of the diaphragm 226.

At a static state, the biasing member 232 engages an interior surface of the valve cover 228 at a first end, and engages a surface of the backing plate 234 at a second end. The backing plate 234 engages the diaphragm 226 and via the biasing member 232 drives the diaphragm 226 into sealing contact with the protuberance 218. The diaphragm 226 thereby seals the tire port channel 222.

During inflation, deflation, or pressure checks of the tire 50, pressurized fluid enters the control cavity 220 via the control ports 224. The increased pressure in the control cavity 220 exerts a force on the diaphragm 226 in the axial direction and thereby at least partially compresses the biasing member 232.

When the wheel valve assembly 200 is exposed to high temperatures during a static state, pressure may increase in the cover cavity 230. The increased pressure in the cover cavity 230 may degrade the overall performance of the wheel valve assembly 200. For example, the increased pressure in the cover cavity 230 may increase the axial force sealing the diaphragm 226 against the tire port 212 protuberance 218; the necessary pressure in the control cavity 220 to disengage the diaphragm 226 from the protuberance 218 may then be increased.

In order to overcome increased pressure in the cover cavity 230, the wheel valve assembly 200 may comprise an equalization valve assembly 240. In certain embodiments, the equalization valve assembly 240 may be normally closed. In an embodiment, the equalization valve assembly 240 may comprise a check valve 300. As illustrated in FIG. 4, check valve 300 may comprise a normally closed ball check valve. In another embodiment, the check valve 300 of equalization valve assembly 240 may comprise a normally closed piston valve (see FIG. 14). The normally closed equalization valve assembly 240 may also be hereinafter referred to as the normally closed check valve assembly but is not limited thereto.

The equalization valve assembly 240 further comprises a first fluid conduit 242 defined by the valve cover 228, and a second fluid conduit 244 defined by the valve body 202. The first fluid conduit 242 may be disposed through the valve cover 228 in a radially extending direction transverse to the longitudinal axis of the valve cover 228. The second fluid conduit 244 may be disposed through the valve body 202 in a radially extending direction transverse to the longitudinal axis of the valve body 202. The first and second fluid conduits 242, 244 are each in fluid communication with the normally closed check valve 300; the first and second fluid conduits 242, 244 are also in selective fluid communication via the normally closed check valve.

Figure 5:
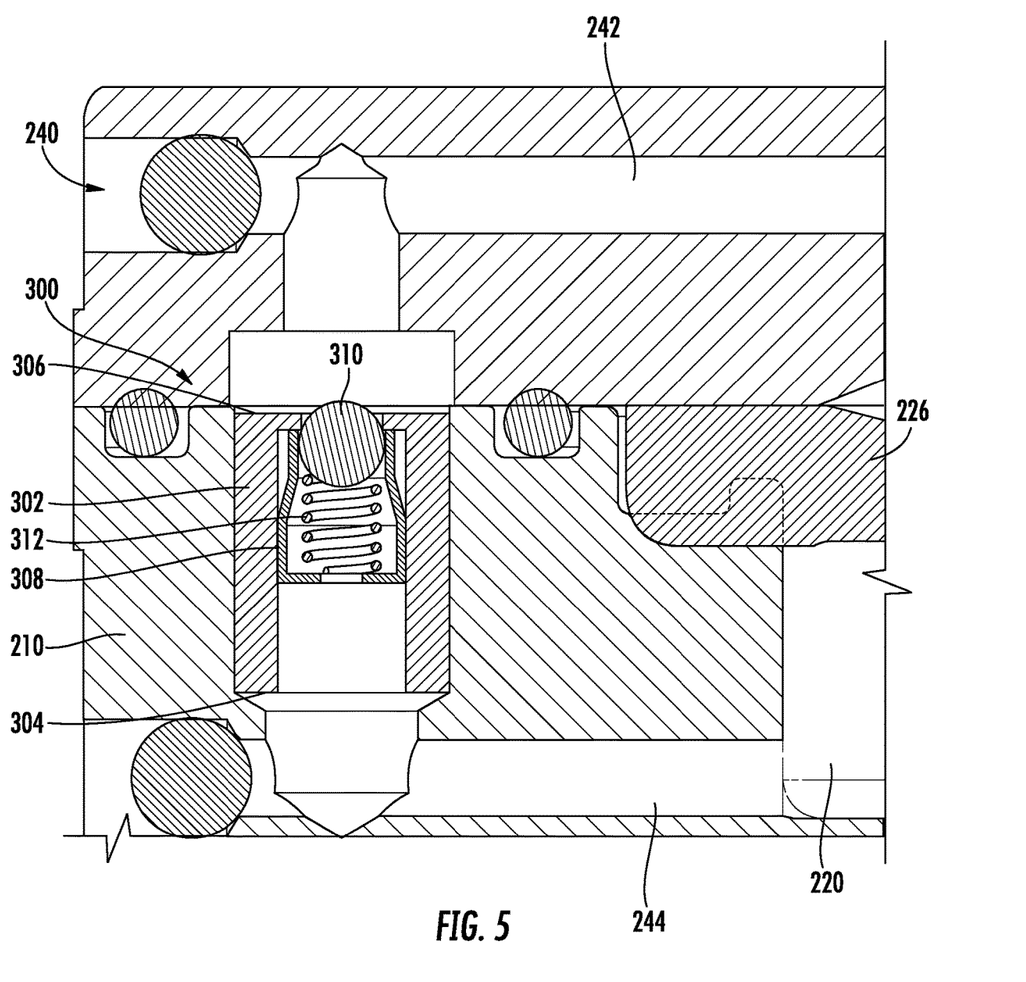
FIG. 5 is a portion of a cross-sectional view of the wheel valve assembly of FIG. 2.
Figure 6:
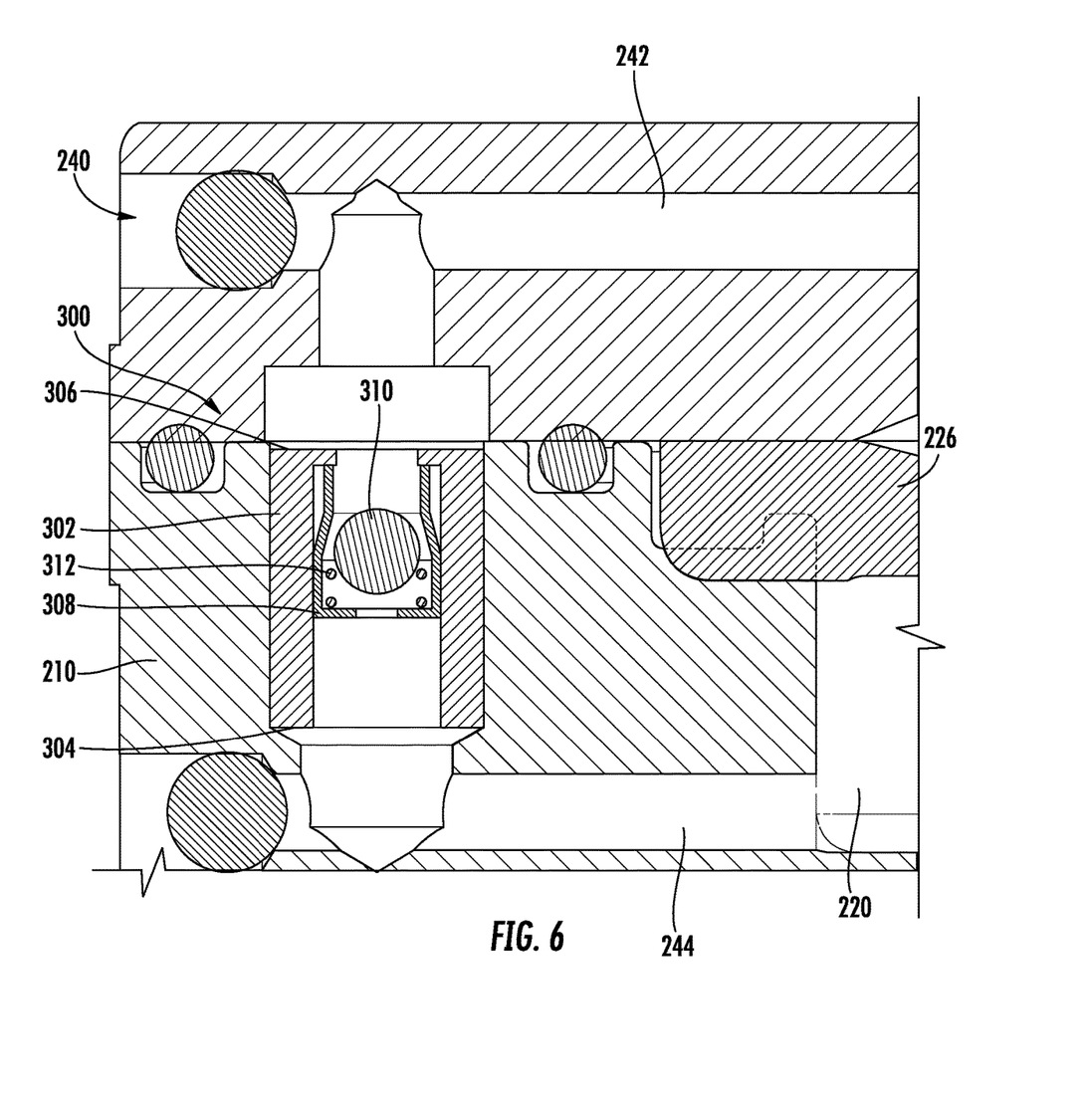
FIG. 6 is a portion of a cross-sectional view of the wheel valve assembly of FIG. 2.

In an embodiment, as illustrated in FIGS. 4, 5, and 6, the check valve 300 is disposed between the first and second fluid conduits 242, 244 and comprises a housing 302. The housing 302 is at least partially disposed in an aperture (or conduit) defined by the valve body 202. The housing 302 includes a first end 304 having a first aperture therethrough and a second end 306 having a second aperture therethrough. The first end 304 aperture has a larger diameter than the second end 306 aperture. A spring cage 308 is disposed within the housing 302. A ball 310 is disposed within the spring cage 308 and is normally biased against a rim of housing 302 first end 304 aperture by a spring 312 to prevent fluid communication between the first fluid conduit 242 and the second fluid conduit 244.

When the pressure in the cover cavity 230 reaches a predetermined level the normally closed check valve 300 is opened to communicate pressurized fluid from the cover cavity 230 to the control cavity 220 until the pressure therebetween is substantially equalized (See FIG. 6). Once the pressure in the cover cavity 230 and the control cavity 220 is substantially equalized, the normally closed check valve 300 is closed (See FIG. 5).

When the wheel valve assembly 200 is activated and the diaphragm 226 is sealingly disengaged from the tire port protuberance 218, the pressurized air within the control cavity 220 does not communicate with the cover cavity 230. The normally closed equalization valve assembly 240 prevents fluid communication from the control cavity 220 to the cover cavity 230.

The pressure in the cover cavity 230 is increased to the predetermined level where the normally closed check valve 300 opens to communicate pressurized fluid to the control cavity 220 by an increased temperature of the pressurized fluid within the cover cavity 230. In conventional wheel valves, a decreased temperature of the pressurized fluid within the wheel valve can create a vacuum which negatively effects the performance of the wheel valve. The equalization valve assembly 240 overcomes the obstacle of a vacuum forming in the cover cavity 230 during cold temperatures via the normally closed check valve 300. The normally closed check valve 300, as illustrated in FIGS. 4-6, permits pressurized fluid to flow (at a low flow-rate) into the cover cavity 230 when a vacuum is created therein, during tire deflate, tire inflate, and tire pressure check operations. The low flow-rate of pressurized fluid into the cover cavity 230 during tire deflate, inflate, and pressure check operations is advantageous for equalizing the cover cavity 230 and the control cavity 220 pressures when the cover cavity 230 experiences a vacuum state at cold temperatures. The flow-rate to the cover cavity 230 must be low enough to not decrease the function of the wheel valve 200 at high temperatures. In an embodiment, not depicted, multiple frustums or frustoconical projections may be disposed on the housing 302 or the ball 310 to control the flow-rate through the check valve 300 to the cover cavity 230 during tire deflate, inflate, and pressure check operations.

Figure 7:
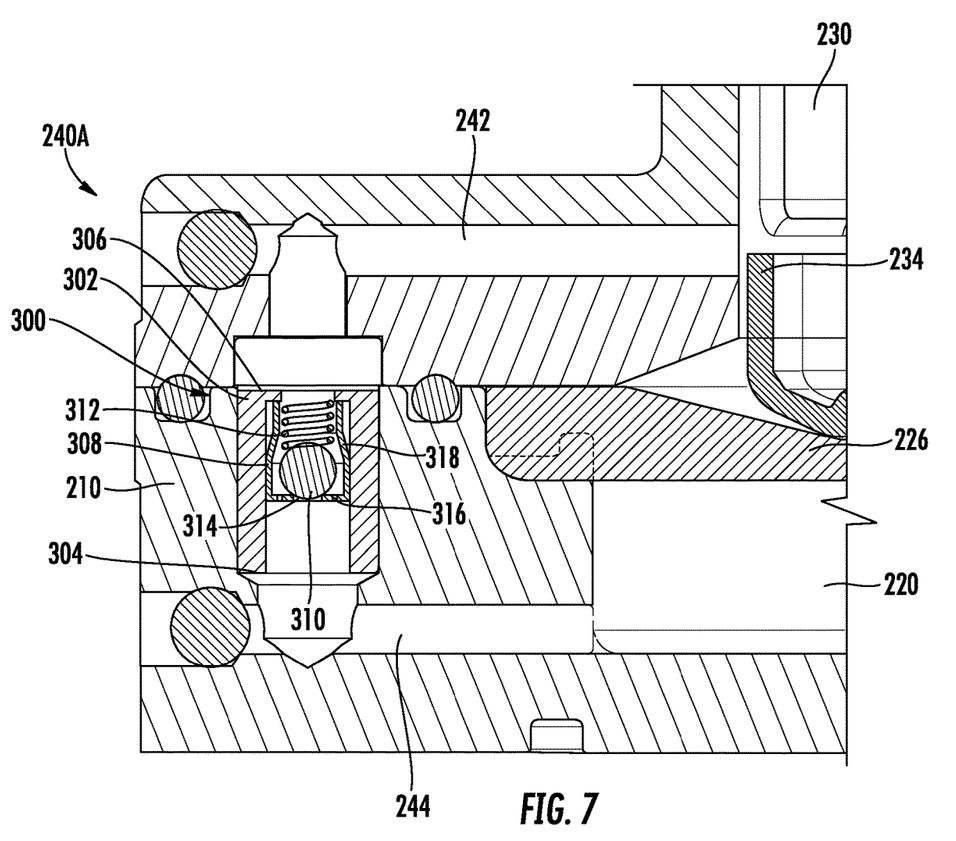
FIG. 7 is a portion of a cross-sectional view of an embodiment of a wheel valve assembly of the tire inflation system of FIG. 1.
Figure 8:
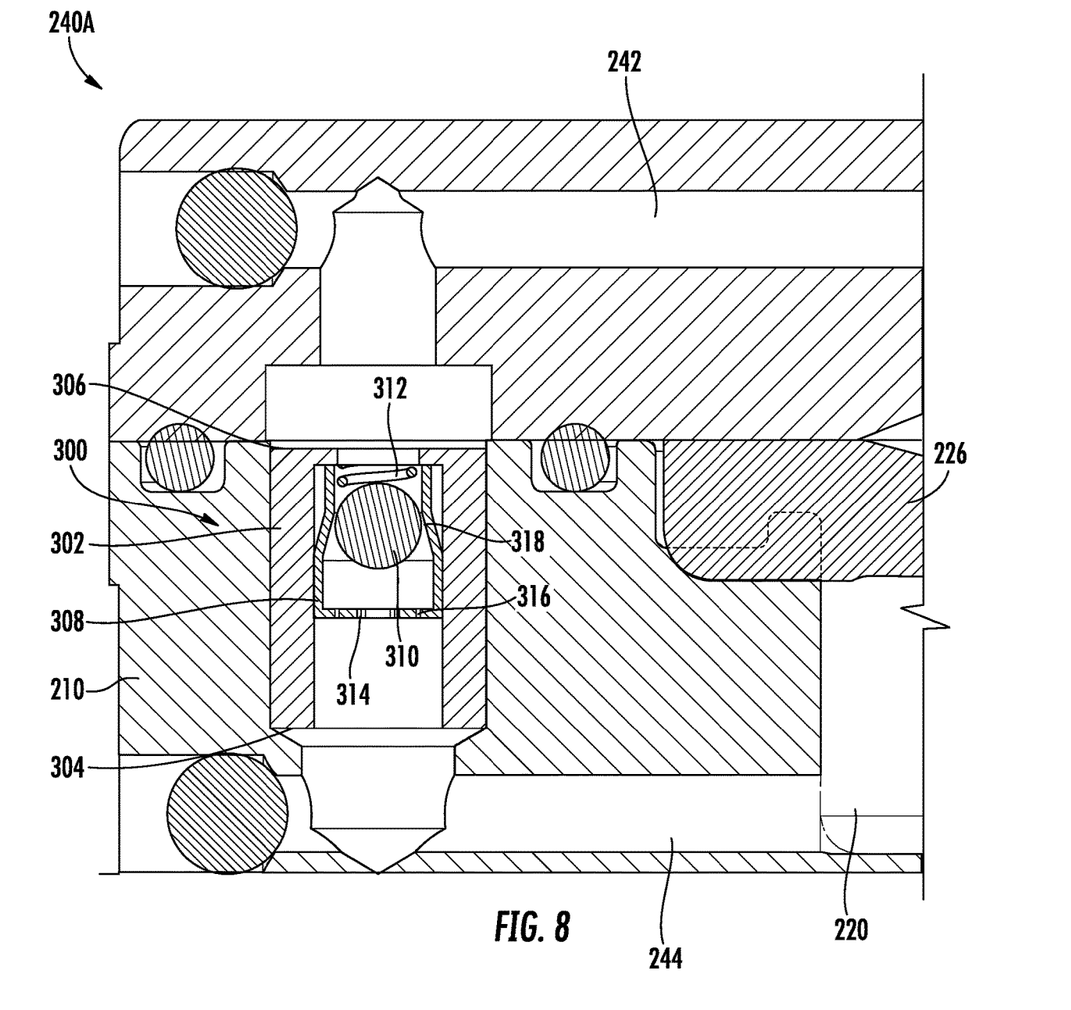
FIG. 8 is a portion of a cross-sectional view of the wheel valve assembly of FIG. 7.

In another embodiment, as illustrated in FIGS. 7 and 8, an equalization valve assembly 240A comprises a normally open check valve 300A. In another embodiment, the equalization valve assembly 240A comprises a normally open piston valve (see FIG. 14). When the wheel valve assembly 200 is exposed to low temperatures during a static state, pressure may decrease in the cover cavity 230 creating a vacuum. The vacuum in the cover cavity 230 may degrade the overall performance of the wheel valve assembly 200. For example, the vacuum in the cover cavity 230 may cause the pressurized fluid in the control cavity 220 to compress the biasing member 232 sealing the diaphragm 226 against the tire port 212 protuberance 218.

As illustrated in FIG. 7, the normally open equalization valve assembly 240A allows constant pressure equalization between the cover cavity 230 and the control cavity 220 during a static state. When the wheel valve assembly 200 is activated and the diaphragm 226 sealingly disengages from the tire port protuberance 218, the normally open check valve 300A of the equalization valve assembly 240A is closed by the pressure in the control cavity 220 to prevent communication of pressurized fluid from the control cavity 220 to the cover cavity 230 (See FIG. 8). Once the wheel valve assembly 200 returns to a static state, the normally open check valve 300A of the equalization valve assembly 240A is opened (See FIG. 7).

In an embodiment, as illustrated in FIGS. 7 and 8, the check valve 300A is disposed between the first and second fluid conduits 242, 244 and comprises a geometry similar to the check valve 300 described above. The check valve 300A comprises a housing 302 at least partially disposed in an aperture defined by the valve body 202. The housing 302 includes a first end 304 having a first aperture therethrough and a second end 306 having a second aperture therethrough. The first end 304 aperture has a larger diameter than the second end 306 aperture. A spring cage 308 is disposed within the housing 302. The spring cage 308 defines an aperture 314 in an end thereof adjacent the second conduit 244. A ball 310 is disposed within the spring cage 308 and has a diameter greater than the diameter of the spring cage aperture 314. The ball 310 is normally sealingly biased against the spring cage aperture 314 by a spring 312. A plurality of apertures 316 are disposed about the spring cage aperture 314 to permit fluid communication between the first fluid conduit 242 and the second fluid conduit 244 when the ball 310 is biased against the spring cage aperture 314.

When the wheel valve assembly 200 is activated and the diaphragm 226 is sealingly disengaged from the tire port protuberance 218, the pressurized air within the control cavity 220 does not communicate with the cover cavity 230. The normally open equalization valve assembly 240A prevents fluid communication from the control cavity 220 to the cover cavity 230 by closing utilizing the same pressurized air which disengaged the diaphragm 226. The ball 310 compresses the spring 312 and seals against an inner surface 318 of the spring cage 308 to prevent fluid communication through the check valve 300A.

Figure 9:
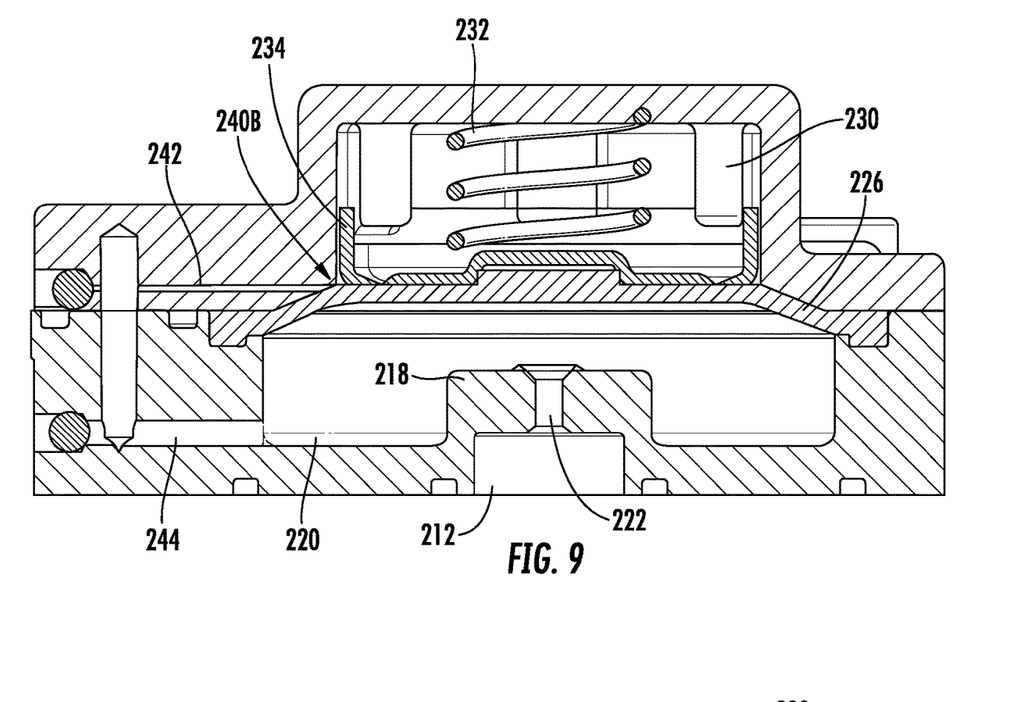
FIG. 9 is a cross-sectional view of an embodiment of a wheel valve assembly of the tire inflation system of FIG. 1.
Figure 10:
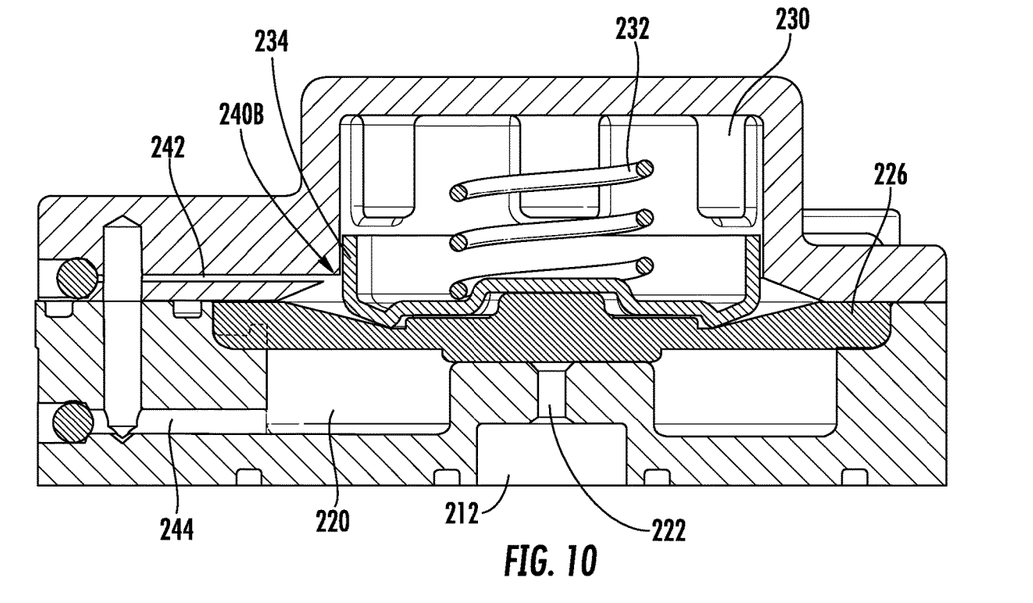
FIG. 10 is a cross-sectional view of the wheel valve assembly of FIG. 9.

In another embodiment, as illustrated in FIGS. 9 and 10, an equalization valve assembly 240B comprises the first and second fluid conduits 242, 244 and the diaphragm 226. As depicted in FIG. 9, the first fluid conduit 242 may comprise a smaller diameter than the second fluid conduit 244 in this embodiment. In this embodiment, the equalization valve assembly 240B is normally open; when the diaphragm 226 is sealingly engaged with the tire port protuberance 218 the cover cavity 230 and control cavity 220 are in fluid communication.

When the wheel valve assembly 200 is activated and the diaphragm 226 is sealingly disengaged from the tire port protuberance 218, the pressurized air within the control cavity 220 does not communicate with the cover cavity 230. The normally open equalization valve assembly 240B prevents fluid communication from the control cavity 220 to the cover cavity 230 by sealingly engaging a portion of the diaphragm 226 with an inlet of the first conduit 242. The equalization valve assembly 240B is closed utilizing the same pressurized air which disengaged the diaphragm 226.

A flow regulator 254 comprising a substantially cylindrical insert may be located within the equalization valve assembly 240A between the first and second fluid conduits 242, 244. The flow regulator 254 may include a first end having a first aperture therethrough and a second end having a second aperture therethrough. The first aperture has a larger diameter than the second aperture. The flow regulator 254 first and second apertures control the flow rate of pressurized fluid from the control cavity 220 to the cover cavity 230, whereby the diaphragm 226 may actuate to seal the inlet of the first conduit 242.

Figure 11:
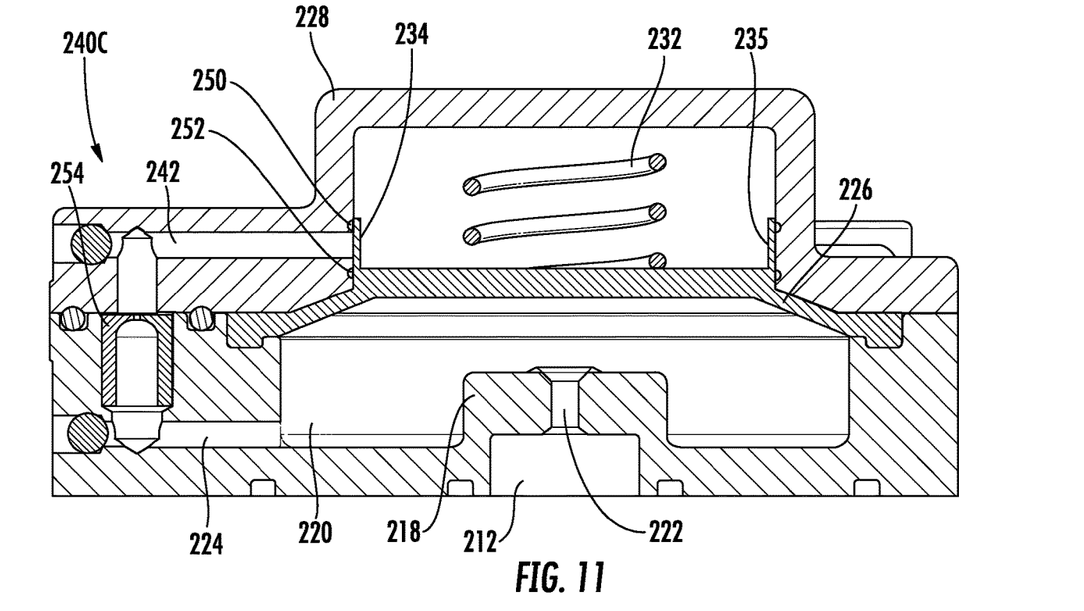
FIG. 11 is a cross-sectional view of an embodiment of a wheel valve assembly of the tire inflation system of FIG. 1.
Figure 12:
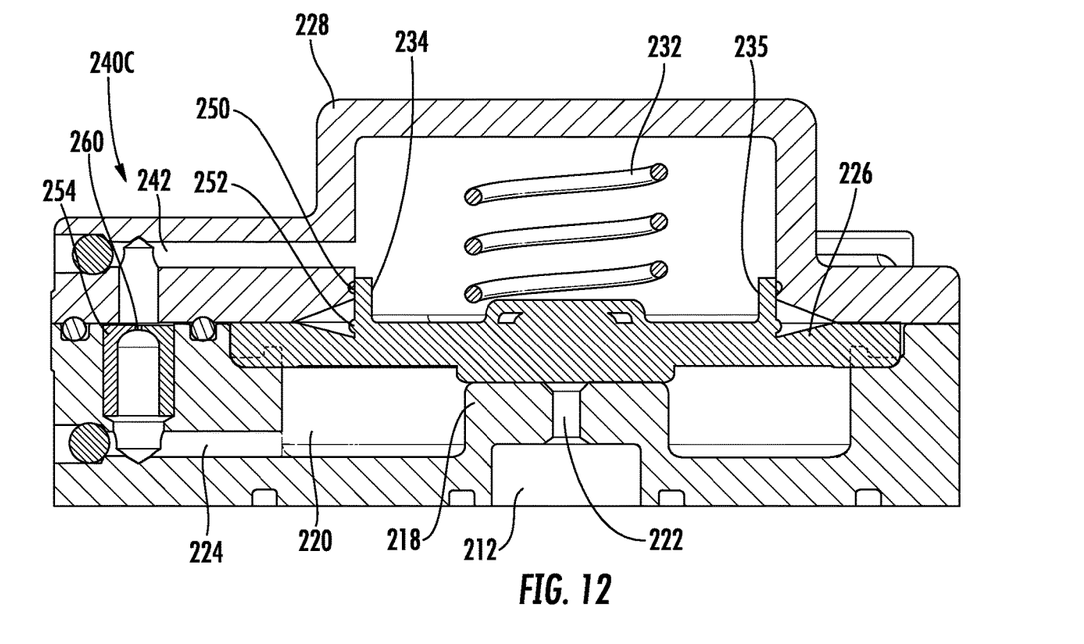
FIG. 12 is a cross-sectional view of the wheel valve assembly of FIG. 11.
Figures 13, 14:
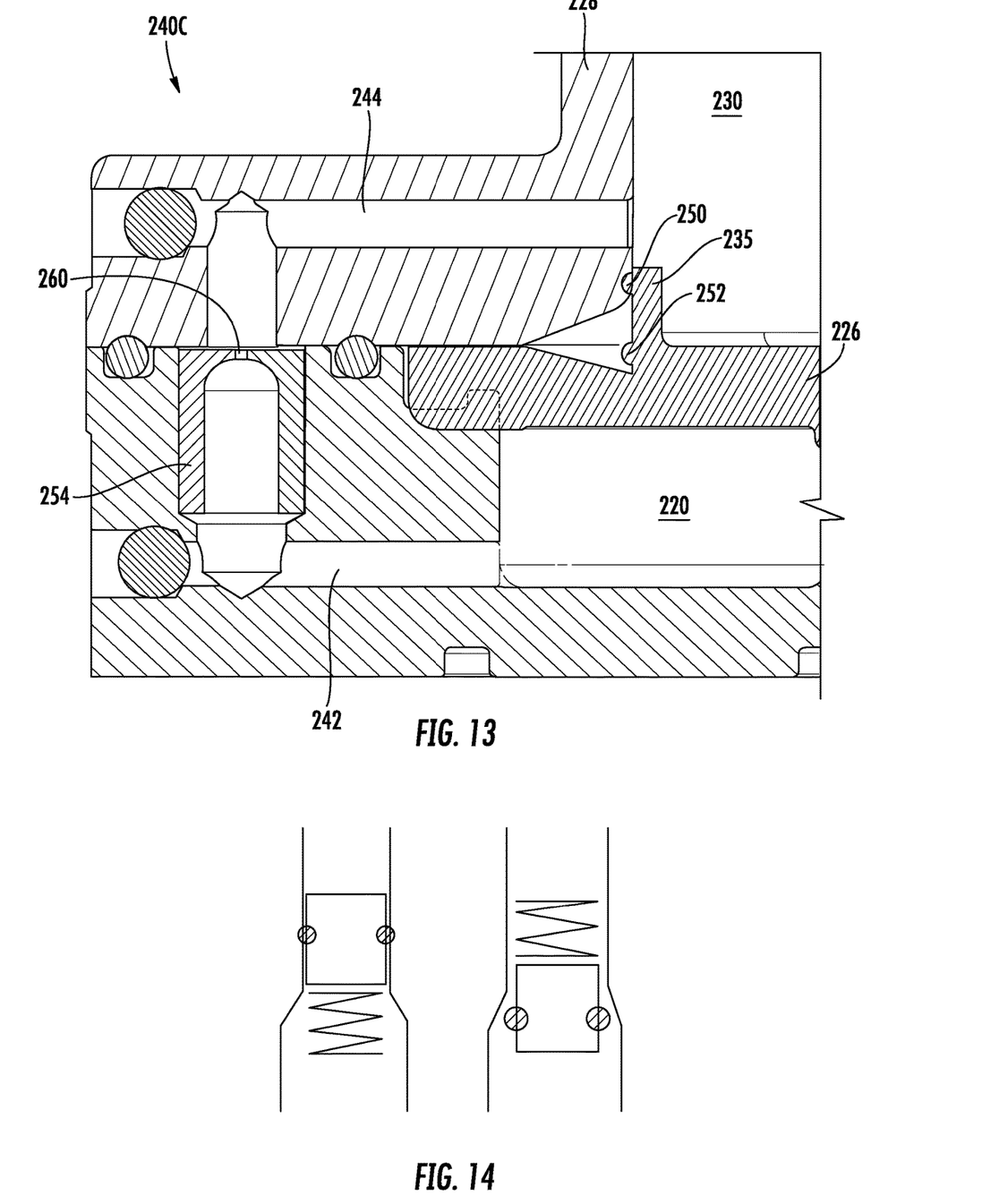
FIG. 13 is a portion of a cross-sectional view of the wheel valve assembly of FIG. 11.
FIG. 14 is a schematic depiction of a portion of the wheel valve assembly of FIG. 2.

In another embodiment, as illustrated in FIGS. 11, 12, and 13, an equalization valve assembly 240C comprises the first and second fluid conduits 242, 244, the diaphragm 226, and the backing plate 234. In the embodiment illustrated in FIGS. 11 and 12, the backing plate 234 and the diaphragm 226 may be formed unitary and integral. The backing plate 234 comprises an annular wall 235 extending in an axial direction from a surface of the diaphragm 226. The backing plate wall 235 comprises two annular dynamic seals 250, 252 located in annular grooves in the outer surface thereof. In an embodiment, the backing plate wall 235 further comprises annular bands (not depicted) for reinforcing the structure of the wall.

When the wheel valve assembly 200 is activated and the diaphragm 226 is sealingly disengaged from the tire port protuberance 218, the pressurized air within the control cavity 220 does not communicate with the cover cavity 230. The normally open equalization valve assembly 240C prevents fluid communication from the control cavity 220 to the cover cavity 230 by sealingly engaging the backing plate wall 235 and seals 250, 252 with an inlet of the first conduit 242. When the equalization valve assembly 240C is closed, the seal 250 sealingly engages the interior surface of the cover 228 above the first fluid conduit 242 inlet, and the seal 252 sealingly engages the interior surface of the cover 228 below the first fluid conduit 242 inlet.

The equalization valve assembly 240C further comprises a flow regulator 254. The flow regulator 254 may comprise a generally cylindrical insert. The insert may comprise a first end and a second end having apertures therethrough, respectively; where the first end aperture has a larger diameter than the second end aperture 260. The small diameter of the insert's second end aperture is of a predetermined size to control the rate at which the pressurized fluid enters the cover cavity 230. The diaphragm 226 is then permitted sufficient time to disengage the tire port protuberance 218, lifting the backing plate 234 such that the wall 235 and the seals 250, 252 may seal the first fluid conduit 242 so that there is no fluid communication between the control cavity 220 and the cover cavity 230 while the wheel valve assembly 200 is activated.

Figure 15:
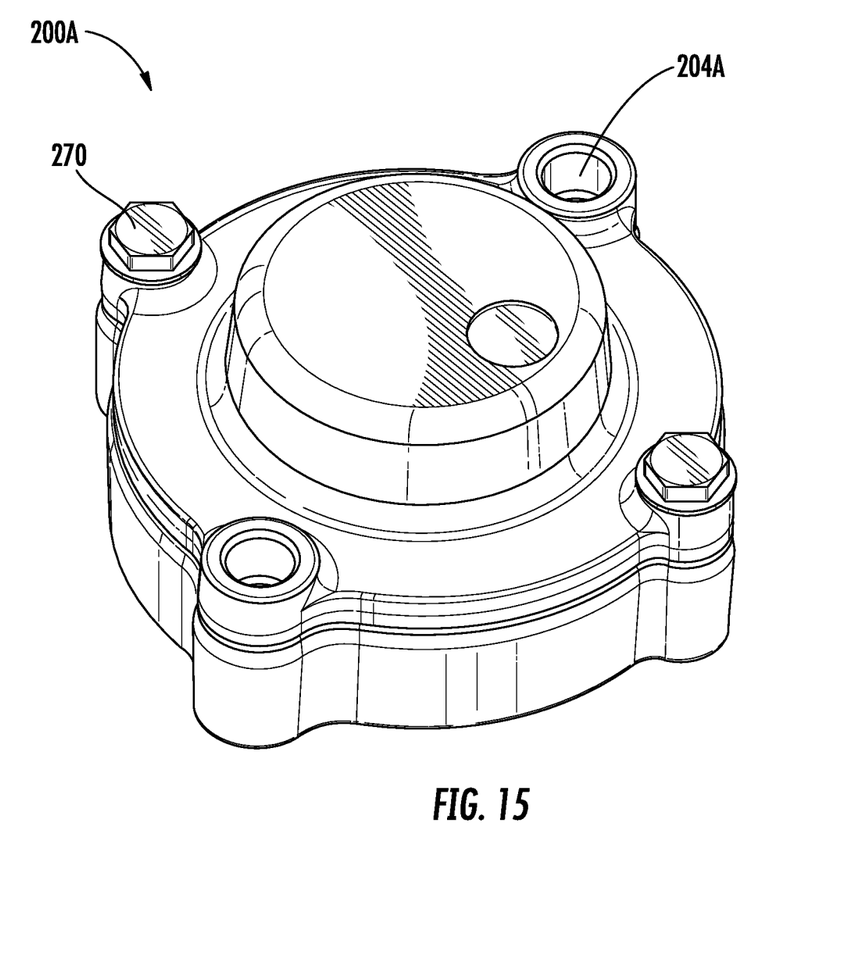
FIG. 15 is an isometric view of another embodiment of a wheel valve assembly of the tire inflation system of FIG. 1.
Figure 16:
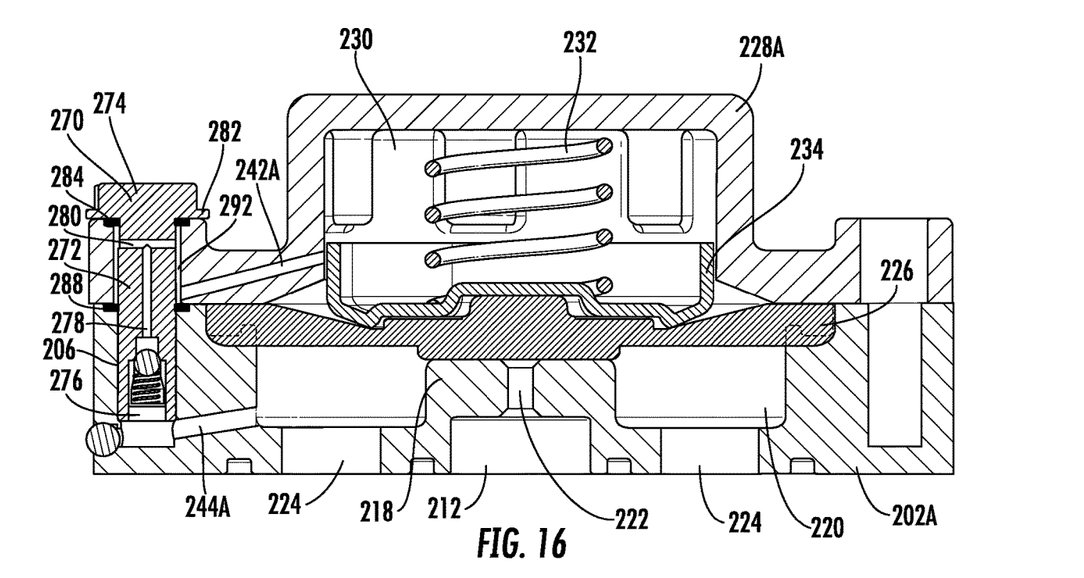
FIG. 16 is a cross-sectional view of an embodiment of the wheel valve assembly of FIG. 15.

In another embodiment, as illustrated in FIGS. 15 and 16, a wheel valve assembly 200A comprises an equalization valve assembly 240D. The wheel valve assembly 200A comprises a similar structure as the wheel valve assembly 200 described above and like elements described herein may be commonly referred to with like reference numerals. The wheel valve assembly 200A obviates the need for a separate equalization valve housing. Instead, the equalization valve assembly 240D comprises a mechanical fastener 270 which houses a normally closed checked valve. The mechanical fastener 270 may be disposed through a fastener aperture 206A in fluid communication with a first fluid conduit 242A and a second fluid conduit 244A, to couple a valve cover 228A with a valve body 202A.

The mechanical fastener 270 comprises a shank 272 and a head 274. The shank 272 may include a threaded portion on an external surface thereof. The shank 272 further includes a first aperture 276 in its end opposite the head 274. The first aperture 276 houses the normally closed check valve. The shank 272 also defines a third fluid conduit 278 in selective fluid communication with the first aperture 276 via the check valve. The third fluid conduit 278 is disposed generally parallel with a longitudinal axis of the shank 272. A fourth fluid conduit 280 is disposed through the shank 272, between the head 274 and the check valve. The fourth fluid conduit 280 is disposed substantially transverse the longitudinal axis of the shank 272. The head 274 includes a flange 282 on the lower surface thereof which abuts the valve cover 228.

A first sealing washer 284 is disposed in a groove 286 of the valve cover 228A. The groove 286 is located about the aperture 206A. The first sealing washer 284 fluidly seals the flange 282 and the valve cover 228A. A second sealing washer 288 is disposed in a groove 290 of the valve body 202A. The groove 290 is disposed about the aperture 206A. The second sealing washer 288 fluidly seals the bottom surface of the valve cover 228A with the valve body 202A around the mechanical fastener shank 272.

The portion of the aperture 206A through the valve cover 228A has a larger diameter than the portion of the aperture 206A defined by the valve body 202A. The sealing washers 284, 288, the shank 272, and the interior surface of the aperture 206A through the valve cover 228A define an annular chamber 292 in fluid communication with the cover cavity 230 via the first fluid conduit 242A and in fluid communication with the fourth fluid conduit 280.

The normally closed check valve operates similarly to the normally closed check valve depicted in FIGS. 5 and 6.

Figure 17:
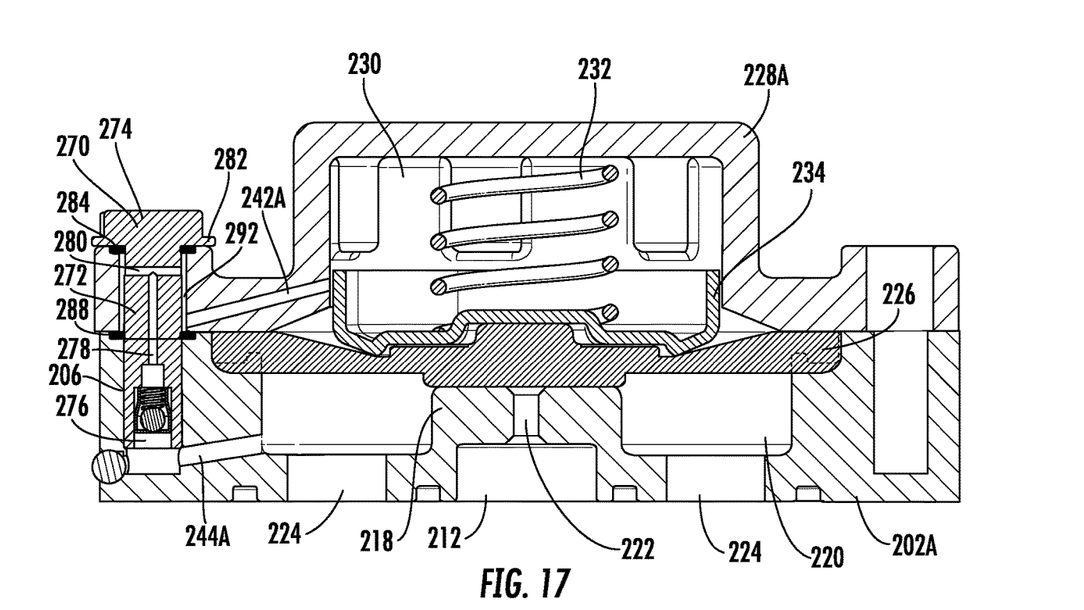
FIG. 17 is a cross-sectional view of another embodiment of the wheel valve assembly of FIG. 15.

In another embodiment, as illustrated in FIG. 17, the mechanical fastener 270 may house a normally open check valve. The normally open check valve allows breathability between the cover cavity 230 and the control cavity 220 under all temperature conditions. When the control cavity 220 is pressurized by the control unit 14, the normally open check valve is closed by the fluid pressure, and fluid communication between the cover cavity 230 and the control cavity 220 is stopped.

While various embodiments have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative, not restrictive.

What is claimed is:

1. A wheel valve assembly comprising:
a body portion coupled with a cover portion;
a diaphragm disposed between said body portion and said cover portion;
a first biasing member disposed between said cover portion and said diaphragm;
a control cavity defined by said body portion and said diaphragm;
a cover cavity defined by said cover portion and said diaphragm;
at least one control port defined by said body portion and in fluid communication with said control cavity;
a tire port defined by said body portion and in selective fluid communication with said control cavity;
a radially extending first conduit disposed in said body portion, wherein said first conduit is in fluid communication with said control cavity;
an axially extending second conduit disposed in said body portion, wherein said second conduit is in fluid communication with said first conduit;
an axially extending third conduit disposed in said cover portion, wherein said third conduit is in fluid communication with said second conduit;
a radially extending fourth conduit disposed in said cover portion, wherein said fourth conduit is in fluid communication with said third conduit and said cover cavity; and
an equalization valve assembly disposed in said second conduit, wherein said equalization valve assembly comprises:
a housing defining a first aperture and a second aperture;
a spring cage fully disposed within said housing, wherein said spring cage includes an end defining one or more spring cage apertures, wherein the one or more spring cage apertures are fully disposed within said housing and wherein the one or more spring cage apertures permit fluid communication between the first aperture and the second aperture;
a ball at least partially disposed within said spring cage and sealingly biased against the one or more spring cage apertures therethrough; and
a second biasing member engaged between a surface of said spring cage and said ball.

2. The wheel valve assembly according to claim 1, wherein at a second position: said first biasing member seals said diaphragm against said tire port; and said ball compresses said second biasing member within said spring cage.

3. The wheel valve assembly according to claim 1, wherein at a first position: said first biasing member seals said diaphragm against said tire port, and said second biasing member biases said ball against said one or more spring cage apertures.

4. The wheel valve assembly according to claim 1, wherein at a second position: said diaphragm compresses said first biasing member; and said ball compresses said second biasing member and seals against a surface of said spring cage.

* * * * *